United States Patent [19]

Galhotra

[11] Patent Number: 5,641,181

[45] Date of Patent: Jun. 24, 1997

[54] CROSS MEMBER FOR A VEHICLE HAVING RACK AND PINION STEERING

[75] Inventor: Ashwani Kumar Galhotra, Farmington Hills, Mich.

[73] Assignee: Ford Motor Company, Dearborn, Mich.

[21] Appl. No.: 408,825

[22] Filed: Mar. 23, 1995

[51] Int. Cl.$^6$ .................................................. B62D 21/03
[52] U.S. Cl. .......................... 280/795; 296/194; 280/771
[58] Field of Search ........................... 280/771, 95.1, 280/781, 785, 795; 180/79; 296/194

[56] References Cited

U.S. PATENT DOCUMENTS

| | | | |
|---|---|---|---|
| 2,652,263 | 9/1953 | Varnum | 280/95.1 |
| 3,074,735 | 1/1963 | Ulrich . | |
| 3,441,289 | 4/1969 | Frantz et al. | 296/194 |
| 3,633,933 | 1/1972 | Millard . | |
| 4,161,327 | 7/1979 | Honecker | 280/771 |
| 4,465,292 | 8/1984 | Fry et al. | 280/95.1 |

FOREIGN PATENT DOCUMENTS

| | | | |
|---|---|---|---|
| 0307366 | 7/1988 | European Pat. Off. . | |
| 2614000 | 10/1988 | France | 280/785 |
| 2676407 | 5/1991 | France . | |
| 722924 | 2/1955 | United Kingdom . | |

OTHER PUBLICATIONS

Aerostar, Explorer, Ranger, Truck Shop Manual, vol. 1 of 2, Engine/Chassis—1991, FPSD, pp. 11–02B–4 through 11–02B–12.

*Primary Examiner*—Paul N. Dickson
*Attorney, Agent, or Firm*—Gregory P. Brown

[57] ABSTRACT

A cross member for use in a motor vehicle having a frame with right and left rails and a rack and pinion steering gear assembly is disclosed. The cross member includes a center portion disposed between the right and left rails and being operative to support a rack and pinion steering gear. The cross member further includes right and left arm portions projecting upwards from the center portion and terminating at first and second ends, respectively. The first and second ends attach to the right and left rails of the motor vehicle frame. The cross member further includes right and left steering gear apertures disposed in the right and left arm portions. The rack and pinion steering gear assembly operatively passes through the apertures, thereby providing maximum free length of the right and left rails and minimum front overhang.

11 Claims, 4 Drawing Sheets

CROSS MEMBER FOR A VEHICLE HAVING RACK AND PINION STEERING

BACKGROUND OF THE INVENTION

1. Field of the Invention

The present invention relates generally to a cross member for a motor vehicle frame. More particularly, the present invention relates to a cross member having passages therein to permit the passage therethrough of rack and pinion steering linkage.

2. Disclosure Information

Motor vehicle frames having longitudinally extending frame rails interconnected with transverse cross members are well known in the motor vehicle industry. The forward portion of the longitudinal frame rails are often designed to absorb energy by plastically collapsing under certain impacts. One factor that determines the energy absorbing character of the motor vehicle is the "free length" of the frame rail. Specifically, this relates to the length of frame extending forward from the forward face of the front cross member.

As is well known, the front cross member serves multiple roles. First, unlike a unibody vehicle, cross-members are interspersed between the longitudinal rails to provide torsional rigidity to the overall frame structure. Second, the front cross member is commonly situated under the front of the engine to provide strength for mounting the engine. Third, the front cross member provides support for the front suspension attachments. The suspension imparts lateral loads on the frame that are best resisted by a transverse cross member.

Recently, another variable has entered the equation for the design of the front end of some vehicles, especially those in the sport utility market segment. Consumers are demanding vehicles with a minimum "overhang." Overhang is one measure of a vehicle's ability to traverse a path having a dramatic change in slope, such as a climbing a steep hill, or entering a steeply inclined driveway. The vehicle with shorter overhang is less likely to drag the front end on the ground. The significant component of vehicle overhang under consideration here is the distance from the front axle centerline to the leading edge of the vehicle, typically the bumper. Therefore, it can be seen that overhang is minimized by locating the front axle as far forward as possible. Since the front cross member is typically mounted just forward of the front axle, the desire to minimize overhang conflicts with the desire to provide maximum "free length" of the frame for absorbing energy.

This conflict has been a significant impediment to incorporating a rack and pinion steering gear assembly into such vehicles. It is commonly known to those skilled in the art to locate the rack and pinion steering gear assembly center line as close to the front axle centerline as possible. Typically this has been accomplished by mounting the rack and pinion gear assembly on the front or the rear face of the front cross member. Unfortunately, the rack and pinion steering gear assembly is as effective as the cross member for purposes of compromising free length. As a result, these locations consume precious free length otherwise required for energy absorption.

One solution has been to locate the rack and pinion steering gear assembly directly beneath the cross member. However, this design significantly compromises ground clearance. The unresolved conflicts created by these design objectives has prevented the incorporation of rack and pinion steering in vehicles of the body on frame design. Instead, as shown in FIG. 1, a recirculating ball steering gear with the associated linkage, has been used, much to the dissatisfaction of many consumers who prefer the tight, crisp steering that is associated with rack and pinion steering assemblies.

Therefore, it would be advantageous to provide a front cross member capable of cradling a rack and pinion steering gear assembly and providing the strength necessary to support the engine and suspension imposed loads, while providing sufficient free length, overhang and ground clearance.

SUMMARY OF THE INVENTION

The present invention solves the problems associated with the prior art by providing a cross member for use in a motor vehicle frame having right and left rails extending substantially parallel to a longitudinal axis of the vehicle. The vehicle also includes a rack and pinion steering gear assembly extending substantially parallel to a transverse axis of the vehicle.

The cross member includes a center portion disposed between the right and left rails and being operative to support a rack and pinion steering gear. The cross member further includes right and left arm portions projecting upwards from the center portion and terminating at first and second ends, respectively. The first and second ends attach to the right and left rails of the motor vehicle frame.

The cross member further includes right and left steering gear apertures disposed in the right and left arm portions. The rack and pinion steering gear assembly operatively passes through the apertures.

It is an advantage of the present invention to provide a cross member for a motor vehicle having a body on frame design which permits the use of rack and pinion steering gear assembly while providing maximum free length of the right and left rails and minimum front overhang. These and other objects, features and advantages of the present invention will become apparent from the drawings, detailed description and claims which follow.

DETAILED DESCRIPTION OF THE PREFERRED EMBODIMENTS

Figure 2:
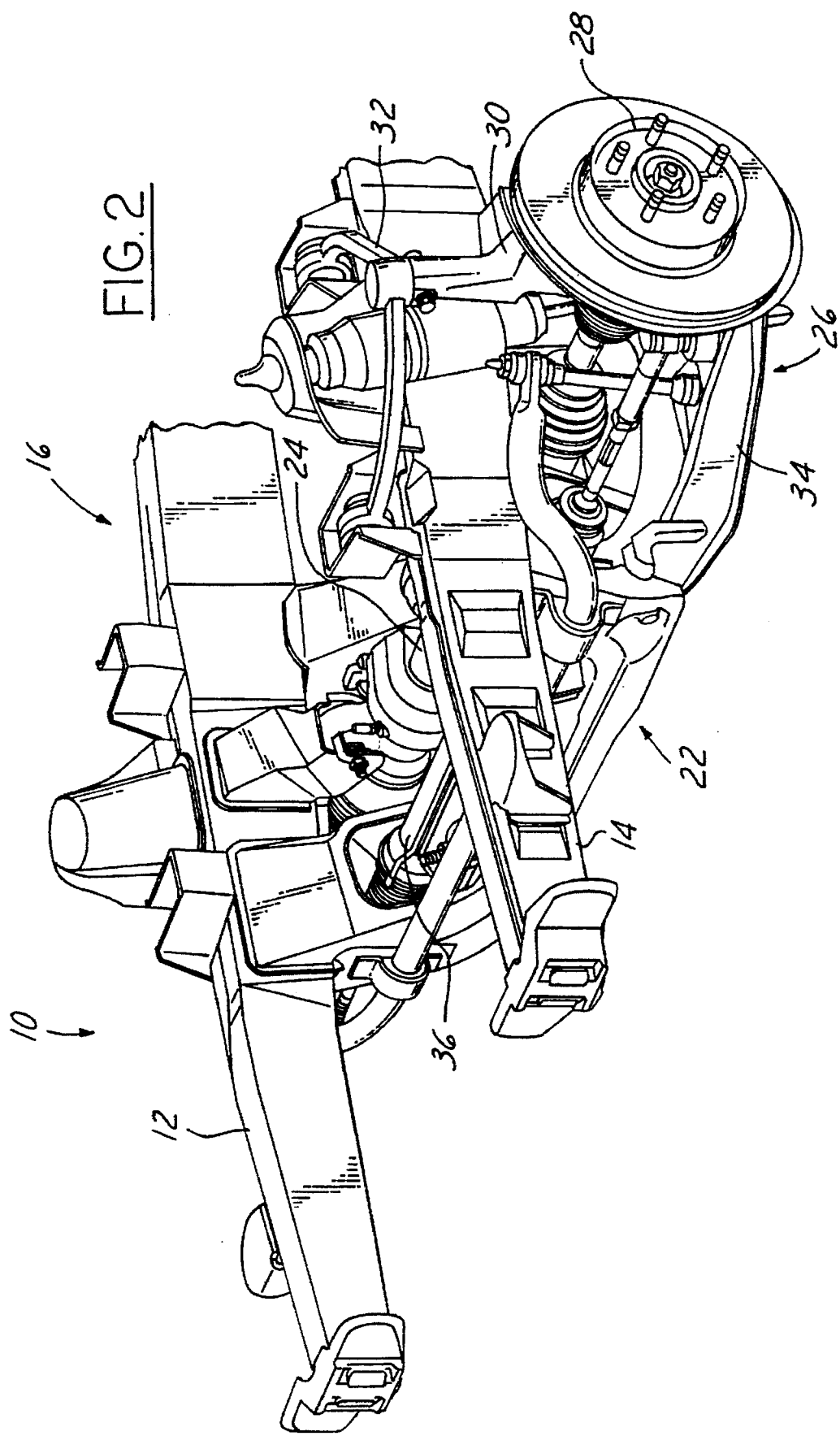
FIG. 2 is a perspective view of a body on frame motor vehicle front end having a front cross member and rack and pinion steering assembly in accord with the principles of the present invention.
Figure 3:
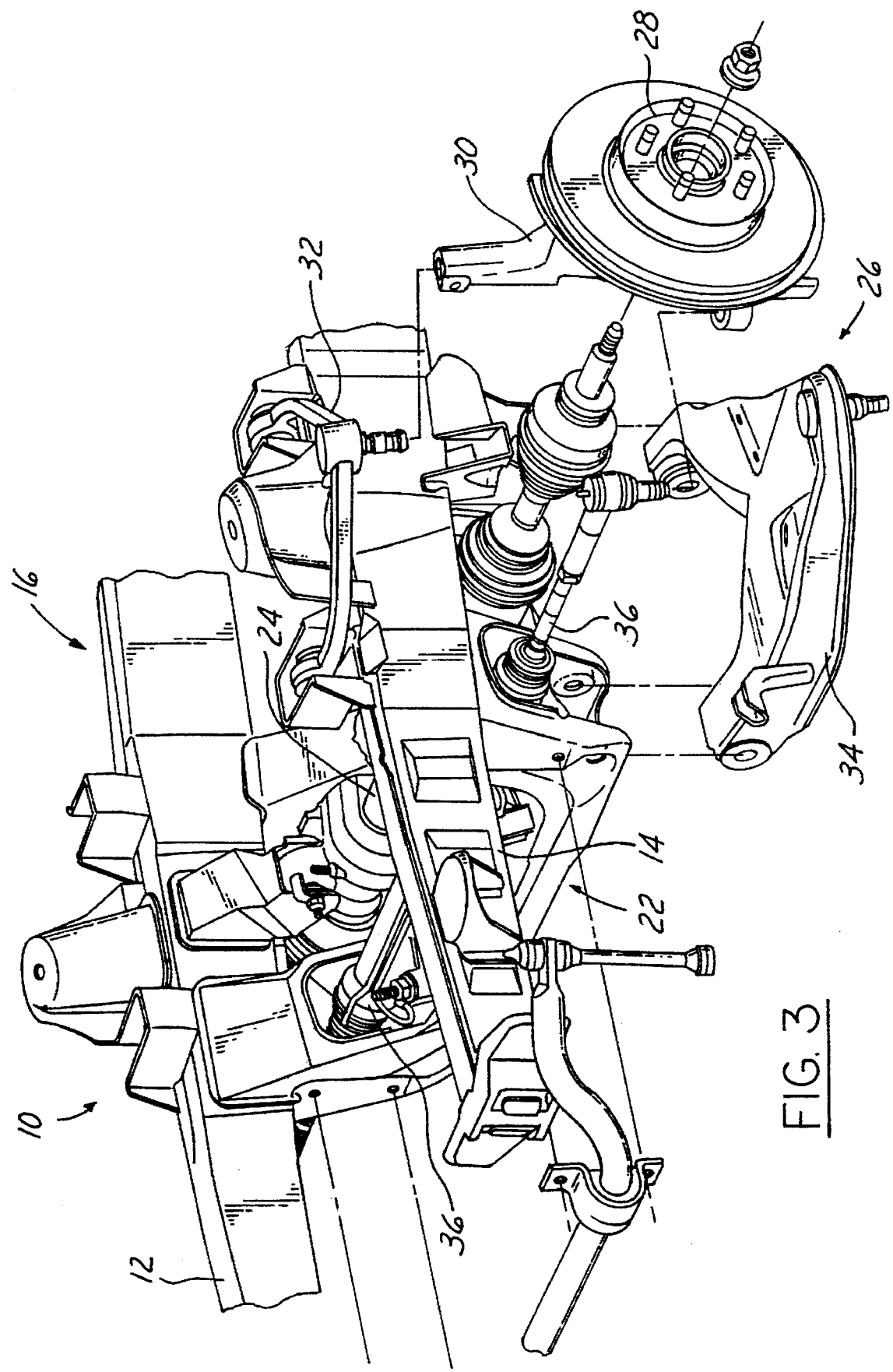
FIG. 3 is an exploded perspective view of a body on frame motor vehicle front end having a front cross member and rack and pinion steering assembly in accord with the principles of the present invention.

Referring now to the drawings, FIGS. 2 and 3 show a body-on-frame design of a motor vehicle 10. The vehicle 10 includes a body (not shown) that rests on right and left rails 12, 14 which are substantially parallel to the longitudinal axis of the motor vehicle 10. The rails 12, 14 combine with several transversely oriented cross members to form torsionally strong frame 16 (shown in part).

A front cross member 22 is generally positioned adjacent to and substantially parallel to a driven front axle 24. In the preferred embodiment, the cross member is disposed forward of the driven front axle 24. As can be seen, the cross member 22 extends between right and left rails 12, 14, substantially transverse to the longitudinal axis of the motor vehicle. Generally, due to the strength of the frame adjacent to the cross member 22, right and left suspensions 26 will depend from the frame adjacent to the cross member 22.

For simplicity, the following description is limited to the left side of the suspension, it being understood that the right side is the same, except where noted. A road wheel (not shown) attaches to hub 28 which is rotatably mounted to a knuckle 30, which is attached to an upper suspension member 32 depending pivotally from the rail 14. The knuckle 30 is also attached to a lower suspension member 34 which depends pivotally from the cross member 22. A rack and pinion steering gear assembly 36 provides steering control to the hub 28 and road wheel assembly (not shown).

Figure 1:
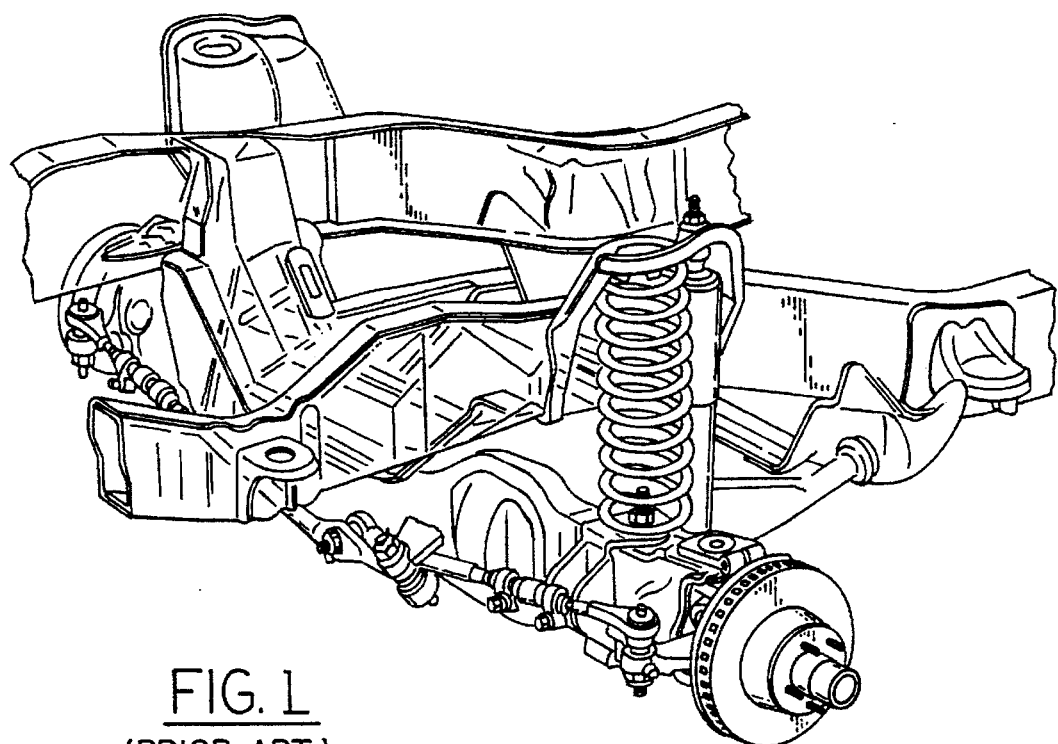
FIG. 1 is a perspective view of a body on frame motor vehicle front end having conventional front cross member and a recirculating ball steering gear and associated steering linkage.
Figure 4:
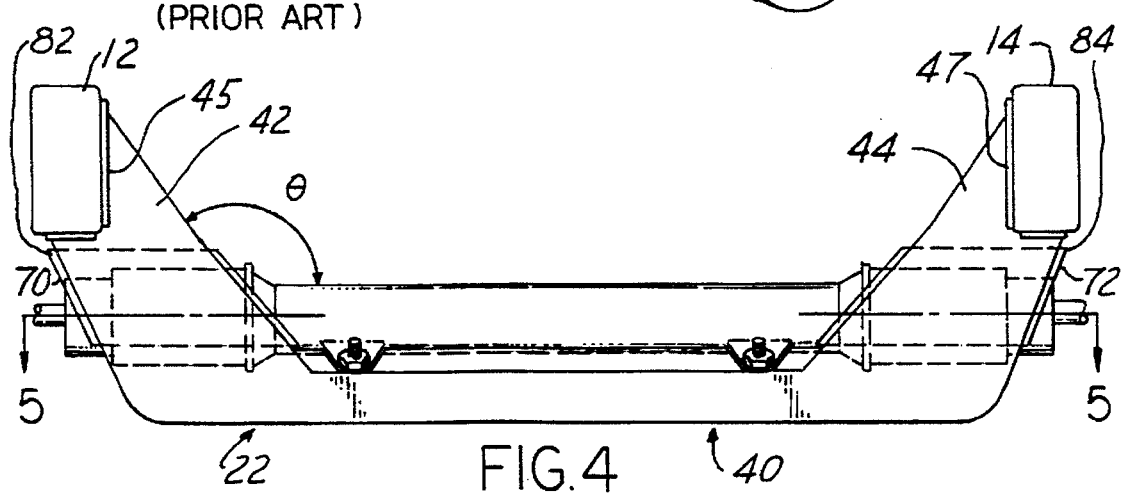
FIG. 4 is an elevational view of a cross member and a rack and pinion steering gear assembly in accord with the principles of the present invention.
Figure 5:
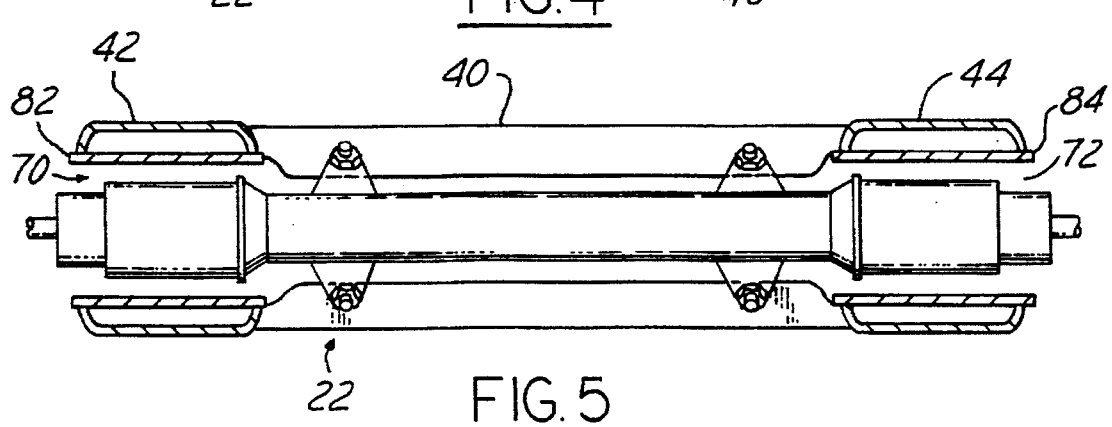
FIG. 5 is a cross-sectional view through lines 5—5 of FIG. 4.

Referring now to FIGS. 4–5, the cross member 22 of the present invention can be seen. The cross member 22 includes a center portion 40 extending between right and left arm portions 42, 44, which in turn project upward to first and second ends, 45, 47, respectively. The right and left arm portions 42, 44 form an angle, θ, with the center portion 40, which ranges in value between 85 and 165 degrees. The first and second ends 45, 47 provide the necessary attachment points to the right and left rails 12, 14 of the motor vehicle frame. Attachment may be by any conventional method, including, but not limited to, welding or fastening with rivets or threaded fasteners.

Figure 6:
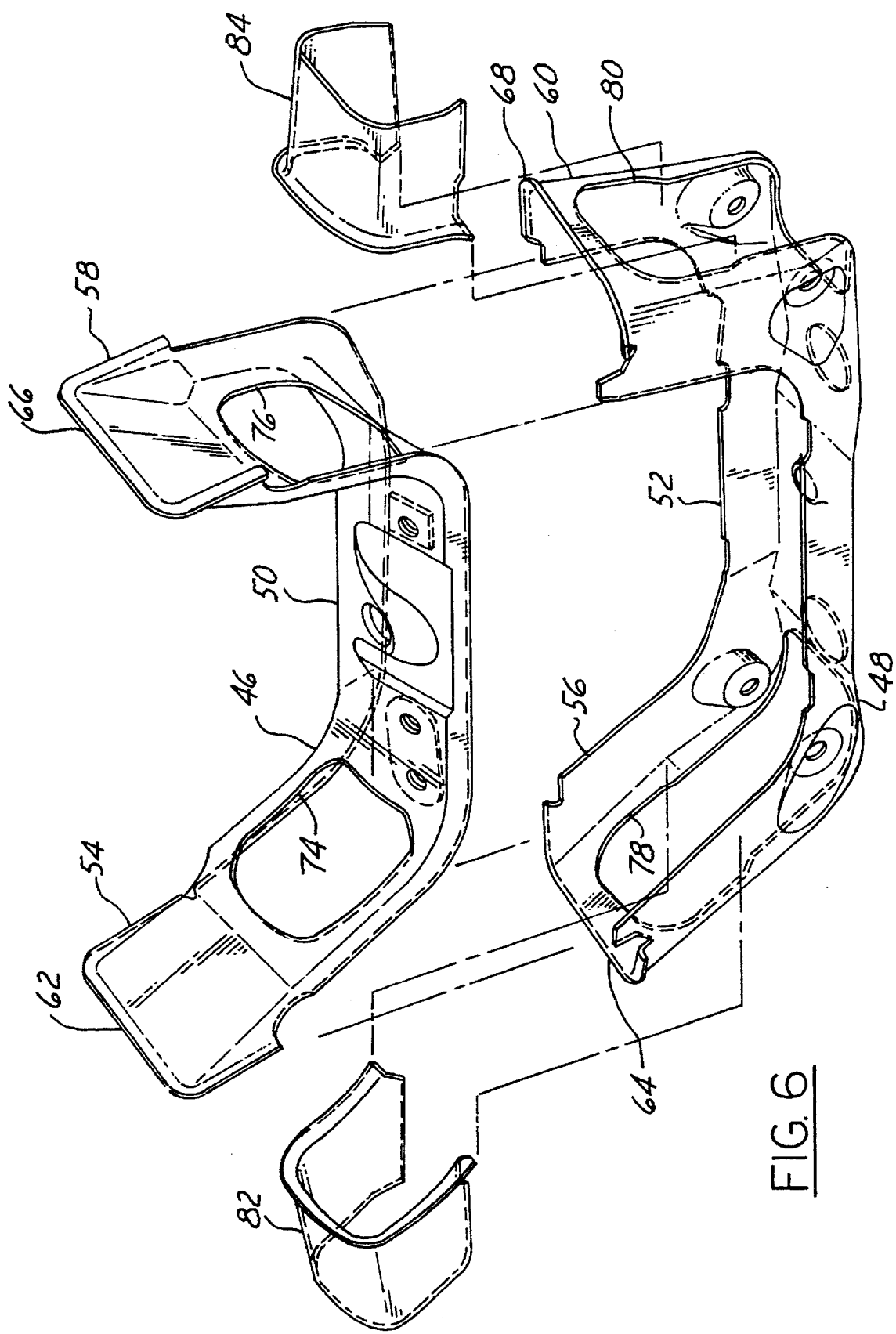
FIG. 6 is an exploded perspective view of a cross member in accord with the principles of the present invention.

Referring now to FIG. 6, a particularly preferred embodiment has the center portion 40 and right and left arm portions 42, 44 formed by joining an upper member 46 to a lower member 48. Specifically, the center portion 40 is formed by joining an upper center portion 50 with a lower center portion 52 of the respective upper and lower members 46, 48. This construction yields a hollow box section having significantly improved torsional and bending resistance than a simple planar or open section construction. The upper and lower members 46, 48 may be joined by any conventional method, including, but not limited to, welding or fastening at appropriate intervals with threaded fasteners or rivets.

Similarly, the right arm portion 42 is formed by joining a right upper arm portion 54 which terminates at an upper first end 62 with a right lower arm portion 56 which terminates at a lower first end 64 of the respective upper and lower members 46, 48. The left arm portion 44 is formed by joining a left upper arm portion 58 which terminates at an upper second end 66 with a left lower arm portion 60 which terminates at a lower second end 68 of the respective upper and lower members 46, 48. In the preferred embodiment, the upper and lower first ends 62, 64 and the upper and lower second ends 66, 68 each provide attachment points to the right and left rails 12, 14 of the motor vehicle frame.

Referring back now to FIGS. 4–5, the cross member 22 further includes right and left steering gear apertures 70, 72 disposed in the right and left arm portions 42, 44. The apertures provide adequate clearance for components of the rack and pinion steering gear assembly 36 to pass through and operate without interference. This permits locating the rack and pinion steering gear assembly 36 at the same position on the longitudinal axis of the motor vehicle as the cross member 22, which in turn provides a maximum free length of the right and left rails with a minimum front overhang.

Referring again now to FIG. 6, the particularly preferred embodiment includes right and left inner steering gear apertures 74, 76 located on the right and left upper arm portions 54, 58, respectively, of the upper member 46. Similarly, right and left outer steering gear apertures 78, 80 are located in the right and left lower arm portions 56, 60, respectively, of the lower member 52. The right inner steering gear aperture 74 is positioned to be axially aligned with the right outer steering gear aperture 78 when the upper and lower members 46, 52 are joined. The left inner steering gear aperture 76 is positioned to be axially aligned with the left outer steering gear aperture 80 when the upper and lower members 46, 52 are joined. Together, the right inner and outer steering gear apertures 74, 78 and the left inner and outer steering gear apertures 76, 80 permit locating the rack and pinion steering gear assembly 36 at the same position on the longitudinal axis of the motor vehicle as the cross member 22.

Referring back now to FIGS. 4–5, the cross member 22 may also include right and left bridge members extending through respective steering gear apertures 70, 72. The bridge members 82, 84 enhance the structural properties of the cross member 22 after providing for the steering gear apertures 70, 72.

Referring to FIG. 6, the bridge members 82, 84 are shown having an inverted U shape and being fitted in the particularly preferred embodiment. The right bridge member 82 has one end adapted to be attached to a portion of the right inner steering aperture 74 in the right upper arm portion 54. The right bridge member 82 extends through the arm to an opposite end which is adapted to be secured to the right outer steering gear aperture 78 in the right lower arm portion 56. Similarly, the left bridge member 84 has one end adapted to be attached to a portion of the left inner steering aperture 76 in the left upper arm portion 58. The left bridge member 84 extends through the arm to an opposite end which is adapted to be secured to the right outer steering gear aperture 80 in the right lower arm portion 60.

All of the components of the cross member 22 can be stamped or otherwise formed from materials capable of sustaining compressive and tensile loads. Such materials include, but are not limited to, steel, aluminum, and high strength synthetic polymeric materials such as high strength polycarbonate.

When installed in the motor vehicle, the center portion 40 of the cross member 22 cradles and supports the rack and pinion steering gear 36. In this manner, the cross member serves the above stated purposes in addition providing superior ground clearance and protection for the rack and pinion steering gear assembly from objects such as rocks, logs, etc. which may protrude from the terrain over which the motor vehicle is driven.

Other variations and modifications of the present invention will, no doubt, occur to those skilled in the art. For instance, those skilled in the art will appreciate, in view of this disclosure, that a cross member according to the present invention may be used on many variations of a suspension. For example, the cross member could be located immediately behind the driven axle while providing the benefits described above. The present invention has applicability to many different types of suspensions and drive axle arrangements used in industrial and automotive designs. It is the following claims, including all equivalents, which define the scope of the invention.

I claim:

1. A cross member for use in a motor vehicle frame having right and left rails extending substantially parallel to a longitudinal axis of the vehicle and a rack and pinion steering gear assembly extending substantially parallel to a transverse axis of the vehicle, said cross member comprising:

a center portion positionable between the right and left rails, said center portion being operative to support a rack and pinion steering gear;

right and left arm portions projecting upwards from said center portion and terminating at first and second ends, respectively, said first and second ends being adapted to attach to the right and left rails of the motor vehicle frame; and right and left steering gear apertures disposed in said right and left arm portions and spaced from said first and second ends so as to permit the rack and pinion steering gear assembly to operatively pass therethrough, thereby permitting maximum free length of the right and left rails while providing minimum front overhang.

2. A cross member according to claim 1, further comprising:

a right bridge member having one end thereof secured to said right arm portion adjacent to a right inner steering gear aperture and an opposite end secured to said right arm portion adjacent to a right outer steering gear aperture; and a left bridge member having one end thereof secured to said left arm portion adjacent to said left inner steering gear aperture and an opposite end secured to said left arm adjacent to a left outer steering gear aperture.

3. A cross member according to claim 2, wherein said right and left bridge members have an inverted U shape.

4. A cross member according to claim 1, wherein said center portion cradles said rack and pinion steering gear assembly thereby providing protection from objects protruding from the terrain over which the motor vehicle is driven.

5. A cross member for use in a motor vehicle frame having right and left rails extending substantially parallel to a longitudinal axis of the vehicle and a rack and pinion steering gear assembly extending substantially parallel to a transverse axis of the vehicle, said cross member comprising:

an upper member having an upper center portion extending between right and left upper arm portions, said right and left upper arm portions projecting upwards from said upper center portion and terminating at upper first and second ends, respectively, said first and second upper ends being adapted to attach to the right and left rails of the motor vehicle frame;

right and left inner steering gear apertures disposed in said right and left upper arm portions, respectively;

a lower member having a lower center portion extending between right and left lower arm portions, said right and left lower portions projecting upwards from said lower center portion and terminating at lower first and second ends, said lower member being adapted to securely engage said upper member and right and left rails of the motor vehicle frame;

right and left outer steering gear apertures disposed in said right and left lower arm portions, respectively;

a right bridge member having one end thereof secured to said right upper arm portion adjacent to said right inner steering aperture and an opposite end secured to said right lower arm portion adjacent to said right outer steering gear aperture; and a left bridge member having one end thereof secured to said left upper arm portion adjacent to said left inner steering aperture and an opposite end secured to said left lower arm portion adjacent to said left outer steering gear aperture;

said apertures permitting the rack and pinion steering gear assembly to operatively pass therethrough, thereby permitting maximum free length of the right and left rails while providing minimum front overhang.

6. A cross member according to claim 5, wherein said right and left bridge members have an inverted U shape.

7. A cross member according to claim 5, wherein said center portion cradles said rack and pinion steering gear assembly thereby providing protection from objects protruding from the terrain over which the motor vehicle is driven.

8. A motor vehicle frame for use in a body on frame motor vehicle, the motor vehicle frame having a driven front axle with steerable front wheel hubs controlled by a rack and pinion steering gear assembly, said motor vehicle frame comprising:

right and left rails extending parallel to a longitudinal axis of the motor vehicle; and a cross member extending between said right and left rails, transverse to said longitudinal axis of the motor vehicle, immediately forward of the driven front axle, said cross member further comprising:

a center portion being operative to support a rack and pinion steering gear;

right and left arm portions projecting upwards from said center portion and terminating at first and second ends, respectively, said first and second ends being adapted to attach to the right and left rails of the motor vehicle frame; and right and left steering gear apertures disposed in said right and left arm portions, said apertures having the rack and pinion steering gear assembly operatively passing therethrough, thereby permitting maximum free length of the right and left rails while providing minimum front overhang.

9. A cross member according to claim 8, further comprising:

a right bridge member having one end thereof secured to said right arm portion adjacent to a right inner steering gear aperture and an opposite end secured to said right arm portion adjacent to a right outer steering gear aperture; and a left bridge member having one end thereof secured to said left arm portion adjacent to said left inner steering gear aperture and an opposite end secured to said left arm adjacent to a left outer steering gear aperture.

10. A cross member according to claim 9, wherein said right and left bridge members have an inverted U shape.

11. A cross member according to claim 8, wherein said center portion cradles said rack and pinion steering gear assembly thereby providing protection from objects protruding from the terrain over which the motor vehicle is driven.

* * * * *